Patented July 30, 1929.

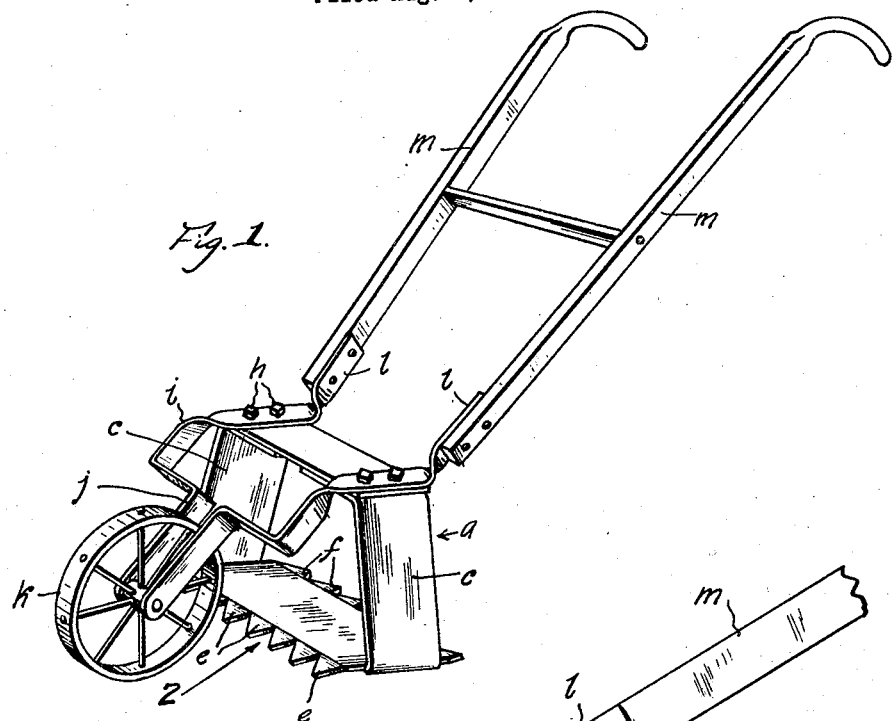
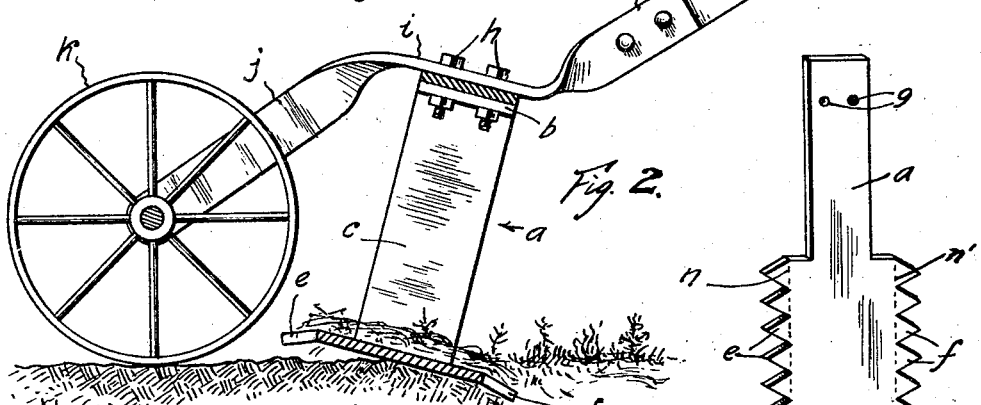
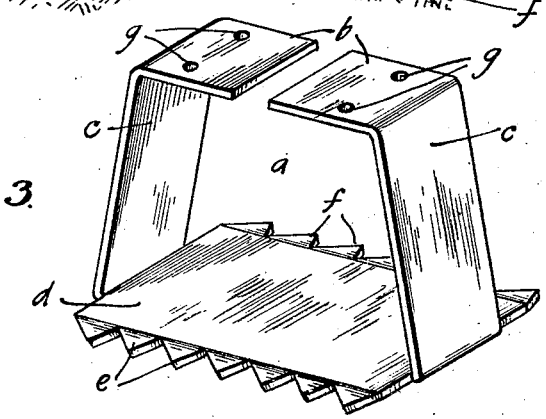

1,722,293

UNITED STATES PATENT OFFICE.

OTTO HOFFMAN, OF WASHINGTON COUNTY, OREGON.

CULTIVATING IMPLEMENT.

Application filed August 6, 1927. Serial No. 211,149.

The object of my invention is to provide a cultivating implement especially adapted for cultivating hard, baked soil, full of weeds. Further, to provide a cultivating implement to be operated like a hoe and weeder, and producing a combined hoeing and raking or harrowing action, and operated by the operator pulling the implement towards him.

In other words to provide an implement that will tend to dig readily into hard ground, and rake and loosen it up, and cut the roots of the grass and weeds.

A further object of my invention is to provide a cultivating implement built for long service; at the same time comparatively inexpensive to manufacture. To this end my invention embodies a working element removable for repair, and reversible for keeping the implement in good working condition for a considerable length of time.

I attain the object of my invention in a cultivating implement comprising a working element consisting of an open, skeleton frame. The base section of said frame is provided with teeth, preferably bent down and extending along both transverse edges; and the working element is removably secured to a supplemental frame, provided with a ground-wheel and handle.

The details of construction of my cultivating implement are hereinafter more fully described with reference to the accompanying drawings, in which Fig. 1 shows a perspective elevation of my cultivating implement;

Fig. 2 shows a longitudinal section taken approximately on the line indicated by the arrow 2 of Fig. 1;

Fig. 3 shows a detail of the working element of my implement, and

Fig. 4 shows a blank for making the working element of my implement.

The working element of my cultivating implement consists of an open skeleton frame $a$, preferably made of one piece as shown by Fig. 4. The working element if preferably formed as shown by Fig. 3, consists of top sections $b$, sides $c$, $c$, and a base section $d$. The sides flare towards the bottom or base section $d$. The latter is provided with teeth, preferably on both its front and rear edges.

The top sections $b$ are provided with bolt holes $g$, for receiving bolts $h$. The working element $a$ is removably secured by the bolts $h$ to a supplemental frame $i$, having a forwardly extending portion $j$, in which is journaled ground-wheel $k$, and a rearward extension $l$, in which is journaled a handle element $m$.

The ground wheel $k$ functions to enable the operator to lift the teeth clear of the ground.

In operating with my implement, the handle end is depressed, so as to cause the teeth on the base section of the working element to bear on the ground. The operator then pulls the implement towards him, at the same time stepping backwards. This motion causes the teeth to penetrate into the ground, as illustrated by Fig. 2, and the cultivation of the section of the soil over which the implement has been drawn is completed. The operator then pushes the implement forward, at the same time lifting on the handles, in so doing lifting the teeth out of the ground; and thereupon the operator repeats his first motions to cultivate a further section of the soil. By the operator pulling the implement towards him instead of pushing it ahead of him he avoids stepping on, and packing down, the loosened soil. It will be found that my implement has, as it were, a combined hoeing and raking or harrowing action.

The teeth should be kept sufficiently sharp so as to be able to cut the roots of the weeds and grass in the section of ground being cultivated.

To prolong the service of my implement, teeth are preferably provided along both transverse edges of the working element, so that when the teeth along one edge become too dull it will not be necessary to stop to sharpen the teeth, but the work with my implement may be continued for a further time by simply removing the bolts $h$, and reversing the working element $a$. And, of course, in case of the working element $a$ being broken, it will be a simple matter to substitute a new working element, or have the latter repaired, since the working element is readily removed from the supplemental frame.

Preferably I bend the teeth down, as on the lines $n$ and $n'$ of Fig. 4, as by so doing the teeth tend to penetrate the ground more readily when the operator pulls the implement towards him in working with it.

The opening in the frame of the working element $a$ functions to permit the weeds and dirt to pass through, and in that way prevents clogging, and makes the work of cultivating easier. The opening incidentally permits the operator to see through the working element, and see the condition of the soil which he has just loosened up.

I claim:

1. A cultivating implement comprising, a working element consisting of a four-sided open frame, the base of the frame provided with downwardly bent teeth along its front and rear edges and a wheel secured to the front, and a handle secured to the rear of said working element.

2. A cultivating implement comprising, a working element consisting of a four-sided open frame, the base of the frame provided with downwardly bent teeth along its front and rear edges and a wheel removably secured to the front, and a handle secured to the rear of said working element.

3. A cultivating implement comprising, a working element consisting of an open frame formed of one piece and composed of a transverse top section and sides of substantial width and a straight base section projecting forwardly and rearwardly beyond the sides, the base of the frame provided with downwardly bent teeth along its front and rear edges and a supplemental frame to which said working element is removably secured, said supplemental frame having bifurcated portions extending forwardly and rearwardly, a ground wheel journaled in the forwardly extending portion of the supplemental frame, and a handle element affixed to said rearwardly extending portion of the supplemental frame.

4. A cultivating implement comprising a working element consisting of an open skeleton frame formed of one piece and composed of a transverse top section, downwardly flaring sides, and a base section parallel with the top section, the base section of the frame provided with teeth, a supplemental frame to which said working element is removably secured, said supplemental frame having portions extending forwardly and rearwardly, a ground-wheel journaled in the forwardly extending portion of the supplemental frame, and a handle element affixed to the rearwardly extending portion of the supplemental frame.

OTTO HOFFMAN.